(No Model.)

G. H. LOWE.
BELT SHIFTER.

No. 367,533. Patented Aug. 2, 1887.

WITNESSES:
George Binkenburg
C. Sedgwick

INVENTOR:
G. H. Lowe
BY Munn & Co.
ATTORNEYS.

N. PETERS, Photo-Lithographer, Washington, D. C.

UNITED STATES PATENT OFFICE.

GEORGE H. LOWE, OF MIDDLETOWN, NEW YORK.

BELT-SHIFTER.

SPECIFICATION forming part of Letters Patent No. 367,533, dated August 2, 1887.

Application filed April 20, 1887. Serial No. 235,471. (No model.)

*To all whom it may concern:*

Be it known that I, GEORGE H. LOWE, of Middletown, in the county of Orange and State of New York, have invented a new and Improved Device for Holding and Shipping Machinery Belts, of which the following is a full, clear, and exact description.

My invention consists, principally, of a device to be applied to a shaft near a pulley and constructed to receive the belt when slipped off from the pulley and to facilitate the shifting of the belt back upon the pulley.

The invention also consists of the special construction of the device, all as hereinafter described and claimed.

Reference is to be had to the accompanying drawings, forming a part of this specification, in which similar letters of reference indicate corresponding parts in both the figures.

Figure 1:
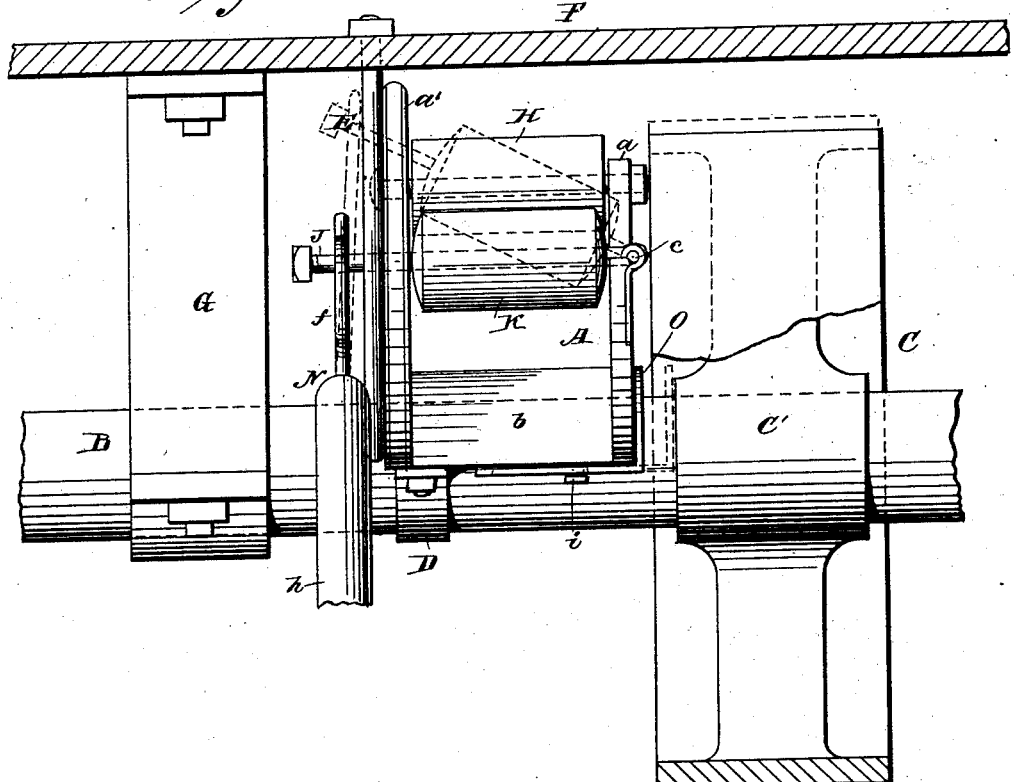
Figure 2:
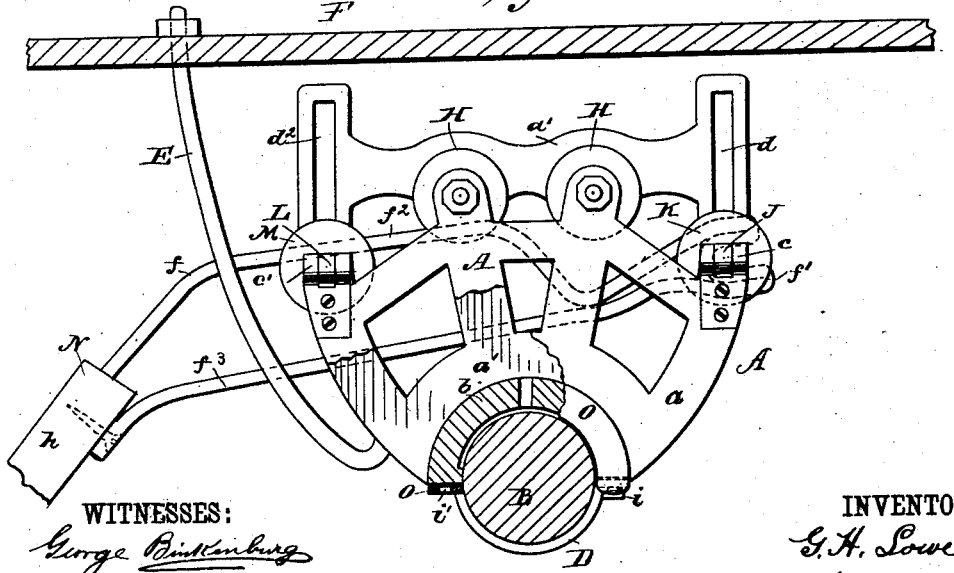

Figure 1 is a side elevation of a shaft, pulley, and shaft-support, showing my invention in position for use; and Fig. 2 is a broken side elevation of the belt holder and shifter, showing the shaft in cross-section.

The main frame A of the belt holder and shifter is composed of the side pieces, $a\ a'$, and the curved bearing $b$, all cast in one piece. The bearing $b$ rests upon the shaft B, and the device is placed near the pulley C, and it is held to the shaft by the strap D, and is prevented from turning out of position on the shaft by the arm E, secured to the support F; or the device may be made fast to the hanger G or to any other convenient and permanent object. In and between the side pieces, $a\ a'$, are journaled the two rollers H. At one side of the rollers H is hinged to the corner of the side piece $a$ by the hinge $c$ the rod J. On this, between the side pieces, $a\ a'$, is placed the roller K, and the outer end of this rod passes through a slot, $d$, in the side piece $a'$, as shown clearly in Fig. 2. At the opposite corner of the side piece $a$ is attached by the hinge $c'$ the rod L, which is in all respects like the rod J, and on it, between the side pieces, $a\ a'$, is placed the roller M, and its outer end passes through a slot, $d^2$, made in the side piece $a'$. (Shown in Fig. 2.)

The peripheries of the rollers H K M are arranged on a curve of the same radius as that of the pulley C, so that a belt slipped from the pulley upon the rollers will be held thereby upon the same plane with the circumference of the pulley.

The outer ends of the rods J L may be lifted in the slots $d\ d^2$, so that the rollers K M may be caused to lift the outer edge of the belt, which will cause it to run off from the rollers upon the pulley. For convenience in lifting the rods J L and rollers K M, I provide the handle N, formed mainly of a rod, $f$, fitted in the wooden hand-piece $h$. The rod $f$ is bent to form the notch $f'$ to engage with one of the rods J or L, and it is bent also to form the upper and lower portions, $f^2\ f^3$, which are spaced to fulcrum upon one of the rods to lift the other, as illustrated in Fig. 2.

In case the hub C' of the pulley is of less length than the width of the band of the pulley, I shall provide the bearing $b$ with the sliding brace O, held to the lower edges of the bearing $b$ by the bolts $i\ i$, passed through slots $i'$, so that by loosening the bolts the brace may be moved out into contact with the hub, as shown in dotted lines in Fig. 1, so that the belt-holder can never be forced too close to the pulley.

Having thus described my invention, what I claim as new, and desire to secure by Letters Patent, is—

1. As a new article of manufacture, a belt holder and shipper comprising a suitable frame provided with rollers to receive the belt from the pulley, one or more of the rollers being adapted to be tilted for shipping the belt to the pulley, substantially as described.

2. The rollers H H, held in a suitable frame, in combination with the side rollers hinged at the inner ends and having projecting rods held in slots for elevating the outer ends of the rollers, substantially as described.

3. The combination, with the main frame having the rollers and formed with the bearing $b$, of the adjustable brace O, substantially as described.

GEORGE H. LOWE.

Witnesses:
DANIEL FINN,
D. F. SEWARD.